United States Patent
Benson et al.

(10) Patent No.: US 6,421,689 B1
(45) Date of Patent: Jul. 16, 2002

(54) MODERATELY CONSERVATIVE, MOSTLY COPYING 2 SPACE GARBAGE COLLECTOR IN THE NURSERY OF A GENERATIONAL MEMORY MANAGER

(75) Inventors: Peter Benson, Boulder, UT (US); Harlan Sexton, Menlo Park, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/110,000

(22) Filed: Jun. 30, 1998

(51) Int. Cl.[7] ............... G06F 12/00; G06F 17/30
(52) U.S. Cl. ........................................ 707/206
(58) Field of Search ......................... 707/206

(56) References Cited

U.S. PATENT DOCUMENTS

| | | | |
|---|---|---|---|
| 4,907,151 A | * 3/1990 | Bartlett | 364/200 |
| 5,088,036 A | * 2/1992 | Ellis et al. | 707/206 |
| 5,321,834 A | * 6/1994 | Weiser et al. | 707/206 |
| 5,687,368 A | * 11/1997 | Nilsen | 707/103 |
| 5,692,185 A | * 11/1997 | Nilsen et al. | 707/104 |
| 5,845,298 A | * 12/1998 | O'Connor et al. | 707/206 |
| 5,873,104 A | * 2/1999 | Tremblay et al. | 707/206 |
| 5,953,736 A | * 9/1999 | O'Connor et al. | 711/6 |

OTHER PUBLICATIONS

Herlihy et al, "Lock–Free Garbage Collection for Multiprocessors". ACM 1991, pp. 229–236.*
Kuchlin, "A Space–Efficient Parallel Garbage Compaction Algorithm". ACM 1991, pp. 40–46.*
Boehm et al, "Mostly Parallel Garbage Collection". ACM 1991, pp. 157–164.*
Hollins et al "Operating system management of large partially allocated objects", IEEE 1993, pp. 42–50.*

* cited by examiner

Primary Examiner—Thomas Black
Assistant Examiner—Uyen Le
(74) Attorney, Agent, or Firm—Hickman Palermo Truong & Becker LLP; Marcel K. Bingham

(57) ABSTRACT

A method and apparatus for copying garbage collection is described. A set of ambiguously referenced objects is identified in a from-space. Live objects in the from-space which are not ambiguously referenced are moved to the to-space, and the ambiguously referenced are transfixed (i.e. left behind to reside in the from-space). The boundaries of the ambiguously referenced are determined. When moving objects to the to-space, the objects are moved into regions between boundaries of objects transfixed in the to-space.

24 Claims, 13 Drawing Sheets

MODERATELY CONSERVATIVE, MOSTLY COPYING 2 SPACE GARBAGE COLLECTOR IN THE NURSERY OF A GENERATIONAL MEMORY MANAGER

FIELD OF THE INVENTION

The present invention relates to management of memory in a computer, and in particular, to garbage collection.

BACKGROUND OF THE INVENTION

Many computer systems provide for dynamic allocation of data objects. The performance of these systems relies on the ability to reclaim memory and re-use memory for dynamically allocated objects after the objects are no longer being used by an executing program. In practice, an object is considered unused when no reference on a computer system refers to the object. When no reference refers to an object, the object is referred to as being dead. Garbage collection includes the process of automatically reclaiming memory allocated to dead objects.

One conventional method of garbage collection is the "tracing" approach. A trace is the identification of objects which may be referenced, directly or indirectly, through a reference in a root set. A root set is one or more areas of memory that contain references which refer to, directly or indirectly, objects that are considered to be "live" for the purposes of garbage collection. A base set is a set of root sets that are traced by a garbage collector to find all the live objects in issue in the area of memory being managed by the garbage collector. Any object not identified through a trace of the root sets in the base set are considered dead, and memory allocated to the object may be reclaimed. For example, object A, object B, and object C reside in memory A. Call stack S is a root set. A reference from call stack S refers to object A, and a reference within object A refers to object B. Object A is thus directly referenced by the reference in call stack S and, object B is indirectly referenced by the reference in call stack S. A trace through the call stack identifies object A and object B, but not object C. Object C is therefore dead, and memory allocated to object C may be reclaimed.

The tracing approach poses several problems for computer systems that use large amounts of memory to store objects. Because execution of processes running on the computer system (e.g. real-time applications) are paused during garbage collection, and a trace accesses all the active objects, long delays in the execution of the processes may occur. Furthermore, accessing all the objects on a computer system violates the presumption of locality of reference that underlies virtual memory operating systems, and may result in excessive memory page thrashing.

These problems have prompted the development of the generational approach to garbage collection. Under the generational approach, two or more areas of memory are used to store objects according to age. The generational approach takes advantage of the empirical observation that newly created ("young") objects tend to "die" quickly (i.e. become unused). Newly created objects under a threshold size (small objects tend to have small life times) are stored in an area of memory referred to as a "nursery".

Under the generational approach, as the object in a nursery ages (e.g. remains alive after a threshold number of garbage collection cycles), the objects are moved from the nursery into another area of memory for storing older objects. Because the nursery contains the newer objects, the memory that is most often reclaimed and reallocated is clustered (i.e. in the nursery). Furthermore, garbage collection is performed more often on objects in the nursery. Thus, under the generational approach, locality of reference is improved.

One common approach to collecting memory from a nursery is the copying approach. Under the "copying" approach, an area of memory (i.e. the nursery) is divided into semispaces. One semispace is designated as the "to-space", and one is designated as the "from-space". Live objects are stored in the from-space, and newly created objects are allocated memory from the from-space.

When there is insufficient memory to allocate for a new object, garbage collection is performed. Objects identified as live through a trace are copied into the to-space. Because most objects in a nursery are dead due to the short life span of the objects, after copying the live objects the total memory allocated to objects in the to-space is much smaller than that was allocated in the from-space. The difference represents reclaimed memory.

In addition to copying objects, a reference referring to any object that was copied must be reset to refer to the new location of the copied object. Finally, the to-space is established as the current from-space, and the former from-space becomes the current to-space. New objects are allocated memory from the reclaimed portion of the newly established from-space.

Some computer languages lack runtime typing of data. It is not always possible to identify at runtime the references used by programs written in such languages. Garbage collectors used to manage the objects used by such programs are hampered by the difficulty in distinguishing object references from other types of data structures (e.g. integers, characters). A memory area that may contain one or more references (e.g. pointers) that may not be distinguishable from other types of data structures stored in the memory area is referred to as an ambiguous root set. A "C" call stack is an example of an ambiguous root set (i.e. a four byte entity stored in the call stack might represent a reference or a procedure parameter of the type integer).

The term "ambiguous reference" refers to a portion of memory (e.g. the number of bytes in a pointer) which may or may not be a reference, but if evaluated as a reference refers to an area of memory occupied by an object. An object referred to by an ambiguous reference is considered to be live and may not be moved to another memory location for the following reason. After moving such an object, the ambiguous reference could not be modified because the ambiguous reference might in fact not be a reference, but instead, may be, for example, an integer. On the other hand, moving the object without modifying the ambiguous reference would break a reference to the object, if indeed the ambiguous reference was in fact a reference.

A hybrid of the copying approach that accounts for the problem of ambiguous references has been proposed by Bartlett. Structures shown in FIG. 1 are used to illustrate the Bartlett approach. FIG. 1 depicts from-space 102 and ambiguous root set 104. From-space 102 contains live object 132, and dead objects 134, 142, and 152. Garbage collection of objects in from-space 102 and its corresponding to-space (not shown) is performed by a garbage collector. Objects in from-space 102 and its corresponding to-space are sufficiently described to garbage collector 170 such that garbage collector 170 may discern boundaries between objects and the data structures contained within objects, as well as the data type of the data structures (i.e. integer, pointer).

Under the Bartlett approach, both the to-space (not shown) and from-space 102 are logically divided into pages, like page 130. Furthermore, an object cannot span a page. Thus, typically there is some memory left unallocated between the last object in a page and the end of the page.

Furthermore, during garbage collection, if any ambiguous reference in ambiguous root set 104 refers to memory that falls within a page, the whole page is "pinned". When a page is pinned, the objects contained in the page are left in the to-space and cannot be garbage collected. In addition, any other objects referred to (directly or indirectly) by objects in the pinned page become ineligible for garbage collection.

For example, ambiguous root set 104 contains an ambiguous reference 106, which refers to object 132 in page 130. Thus page 130 is pinned. Furthermore, object 134, which is in page 130, cannot be moved or garbage collected. Object 134 refers to object 142. Although object 142 can be moved, it cannot be garbage collected. Likewise, object 152, which is referred to by object 142 (and thus indirectly by object 134), can be moved but cannot be garbage collected.

The advantage of the Bartlett approach is that it can be performed very quickly. Scanning for ambiguous references in an ambiguous root set and determining which pages should be pinned only requires a few relatively quick operations (e.g. masking operations on the ambiguous pointer).

However, a major disadvantage of the Bartlett approach is that it inefficiently uses memory. In particular, memory between the last object in a page and the end of the page is not allocated. Furthermore, a large amount of memory occupied by objects within the same page as ambiguously referenced objects must remain uncollected, even though all or many of the objects are dead. Specifically, when an ambiguous reference refers to a first object in a first page, all the objects in the first page cannot be collected, even though all or many of the objects may be dead. In addition, any other object referred to directly or indirectly by any object in the first page becomes ineligible for garbage collection. For example, object 142 and object 152 cannot be garbage collected even though they are dead (i.e. not referred to by any reference, ambiguous or otherwise).

Based on the foregoing, it is desirable to provide a "copying" garbage collection method that accounts for ambiguous references and that quickly performs garbage collection without the overhead of wasted memory attendant the Bartlett approach.

SUMMARY OF THE INVENTION

A method and apparatus for a copying garbage collector are described. According to an aspect of the present invention, a set of ambiguously referenced objects is identified in a from-space and their boundaries are determined. Live objects in the from-space which are not ambiguously referenced are moved to the to-space, and the ambiguously referenced are transfixed (i.e. left behind to reside in the from-space). When moving objects to the to-space, the objects are moved into regions between boundaries of objects transfixed in the to-space.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for garbage collecting is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 10:
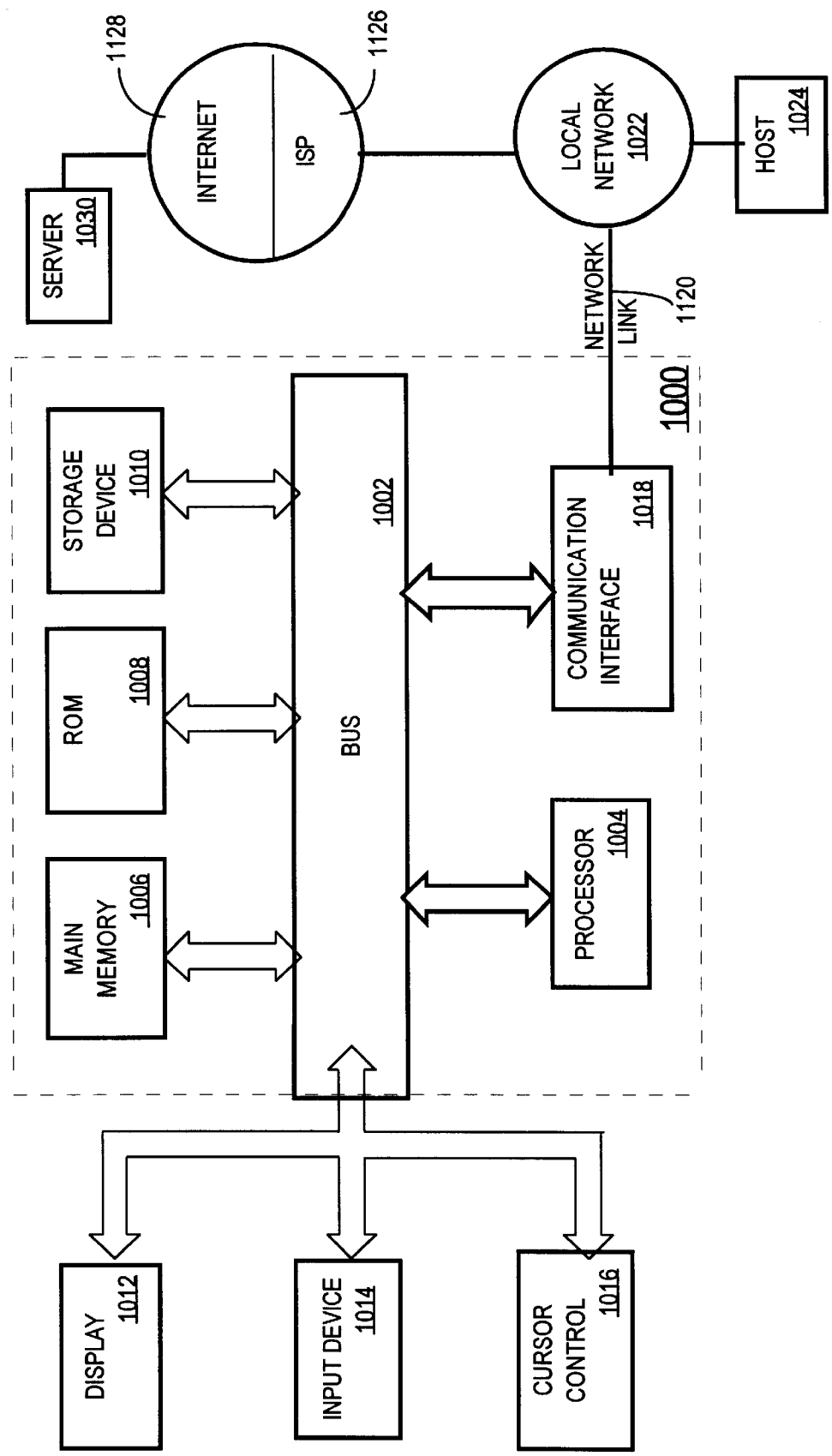
FIG. 10 is a block diagram depicting a computer system upon which an embodiment of the present invention may be implemented.

FIG. 10 is a block diagram that illustrates a computer system 1000 upon which an embodiment of the invention may be implemented. Computer system 1000 includes a bus 1002 or other communication mechanism for communicating information, and a processor 100 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for garbage collection. According to one embodiment of the invention, garbage collection is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for garbage collection as described herein.

The received code may be executed by processor 1004 as it is received, and/or stored in storage device 1010, or other non-volatile storage for later execution. In this manner, computer system 1000 may obtain application code in the form of a carrier wave.

TERMINOLOGY

The term "precise reference" is a reference that the garbage collector knows to be a reference, and not some other type of data.

A "live object" is an ambiguously referenced or precisely referenced object

An "ambiguously referenced object" is an object referenced by an ambiguous reference in a root set, and/or by an ambiguous reference in a live object;

A "precisely referenced object" is an object that is precisely referenced in a root set and/or in a live object, but that is not ambiguously referenced in the root set or in any live object.

A "dead object" is an object that is not a live object.

FUNCTIONAL OVERVIEW

Figure 1:
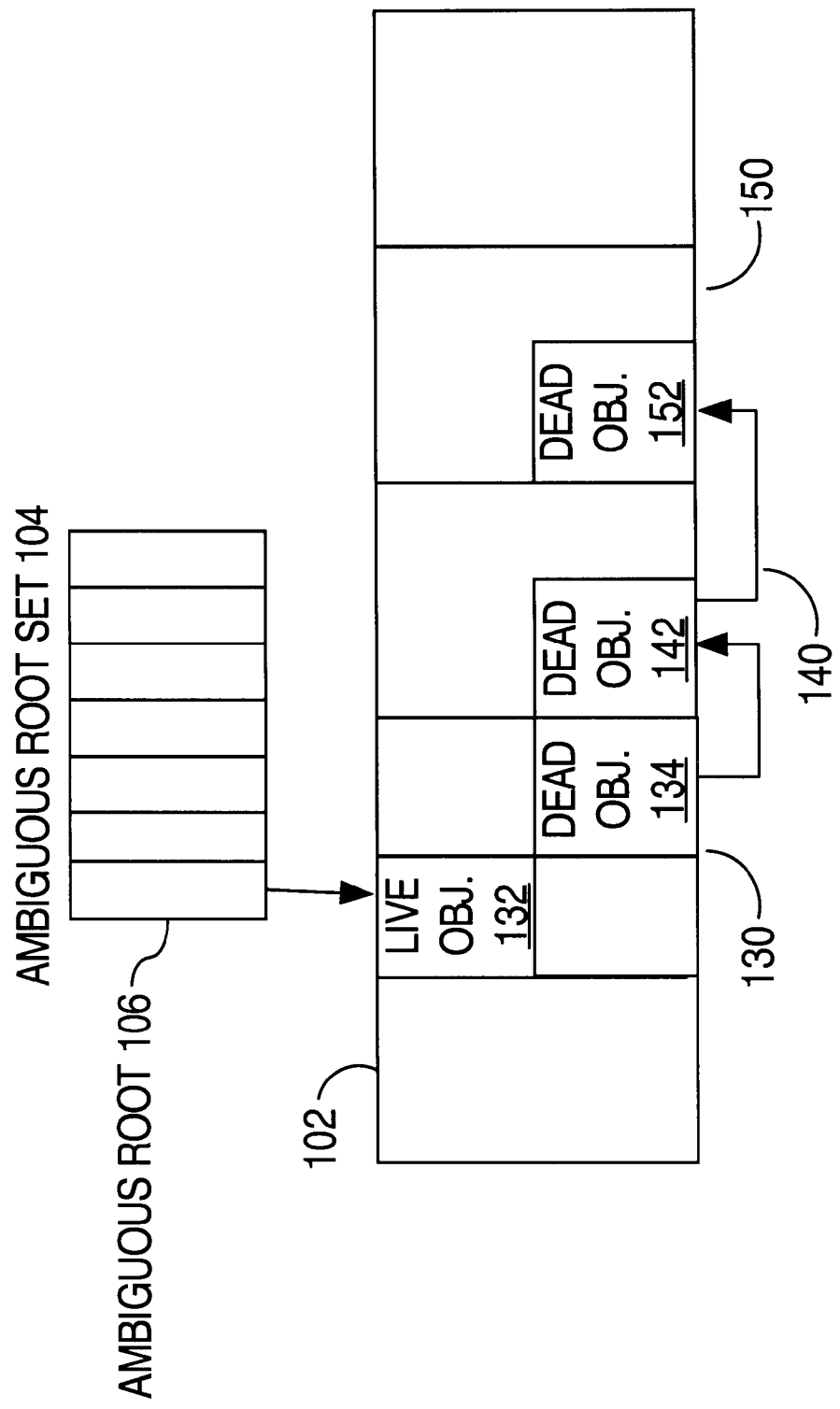
FIG. 1 is a block diagram showing objects in a semispace that are managed by a garbage collector using a conventional approach for copying garbage collection.
Figure 2A:
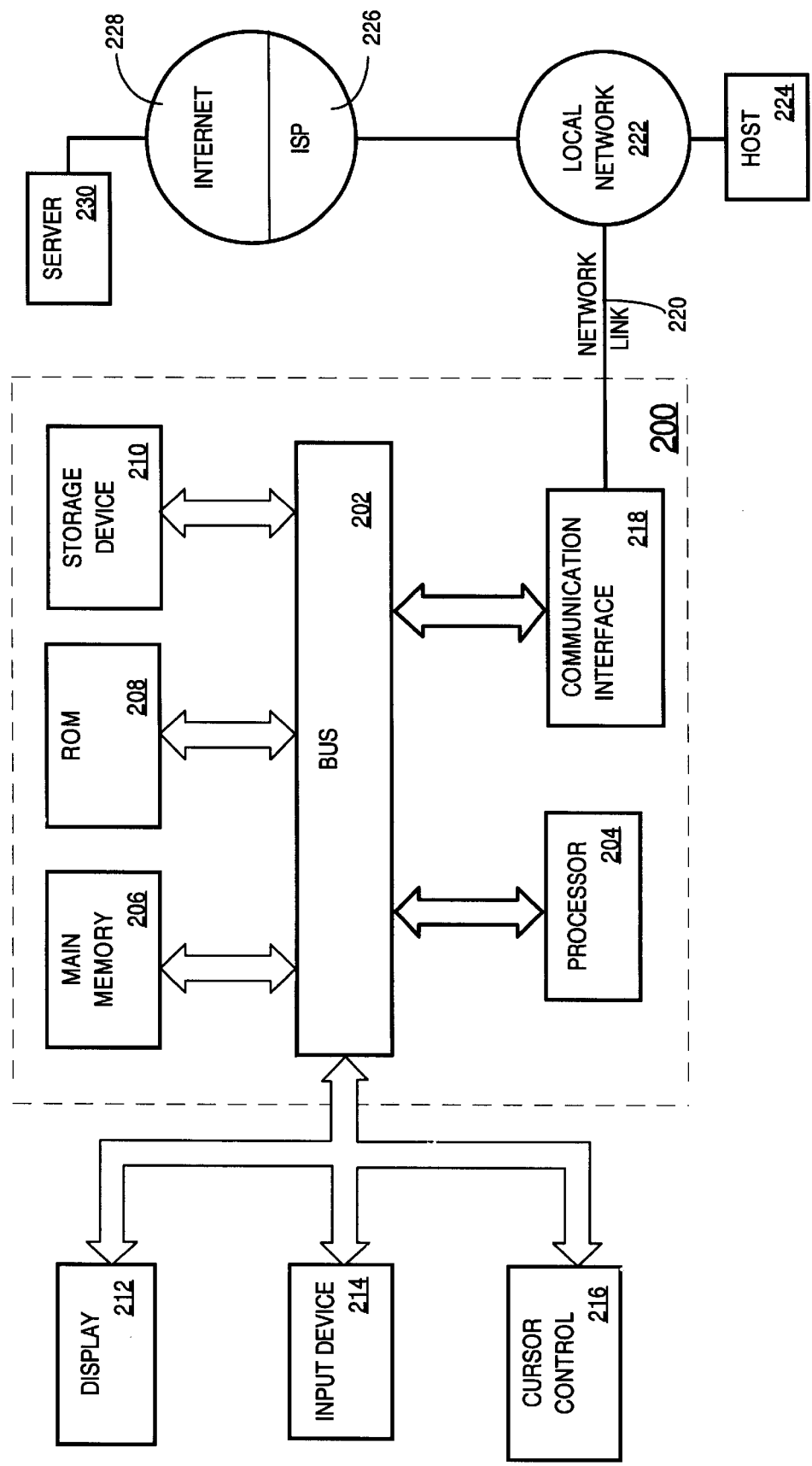
FIG. 2 is a high level flow chart showing a technique for copying garbage collection of objects stored in the semispace according to an embodiment of the invention.
Figure 2B:
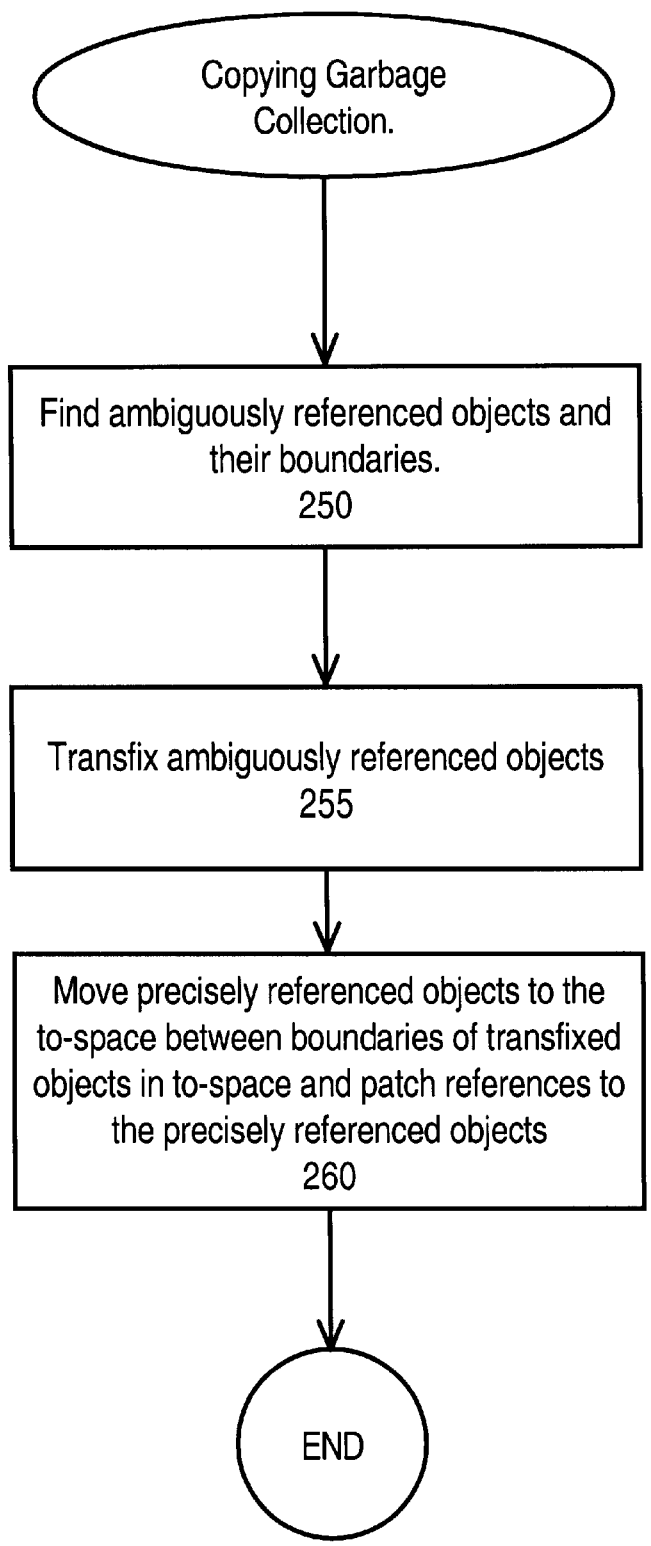

FIG. 2 shows a high level flowchart showing a technique for copying garbage collection of objects stored in semispaces according to an embodiment of the present invention. The steps are executed by a garbage collector when invoked in response to detecting a variety of garbage collection events. Garbage collection events include, for example, insufficient memory to allocate for a new object, or the lapse of a threshold period of time. Each invocation of the garbage collector that is made for the purpose of reclaiming memory is referred to as a garbage collection cycle.

Referring to FIG. 2, at step 250, ambiguously referenced objects in a from-space, and their boundaries, are found. At step 255, the ambiguously referenced objects that are found in step 250 are transfixed. The term "transfixed" refers to the fact that the objects are left where they currently reside, and any references to them are preserved (i.e. not modified). At step 260, the precisely referenced objects are moved into the to-space between the boundaries of any transfixed objects, and any references to the precisely referenced objects are patched.

After completing these steps, the only objects remaining in the from-space are the ambiguously referenced transfixed objects. The current from-space becomes the to-space, and the current to-space becomes the from-space, and the garbage collection cycle ends.

After performing garbage collection, memory for new objects is allocated from the from space. The memory is allocated from the memory areas between the transfixed objects that reside in the current from-space.

The garbage collection techniques described herein account for ambiguous roots while conserving space, as compared to conventional methods such as Bartlett. The space is conserved by eliminating at least two sources of waste under Bartlett. First, the waste due to objects left uncollected simply because they are in a pinned page is eliminated. This space is conserved because only the ambiguously referenced objects are left uncollected in the from-space. Also eliminated is the waste due to objects that are not in pinned pages, but are left uncollected because they are referenced by an object that could be collected but for being in a pinned page.

EXEMPLARY SEMISPACES, ROOT SET, AND GARBAGE COLLECTOR

The techniques described herein may be performed by a garbage collector that manages semispaces that are used to store a set of objects. The set of objects includes a subset of live objects, which are each referred to, directly or directly, by a reference in a root set. To facilitate a description of those techniques, an exemplary semispace, base root set, and garbage collector are described.

Figure 3A:
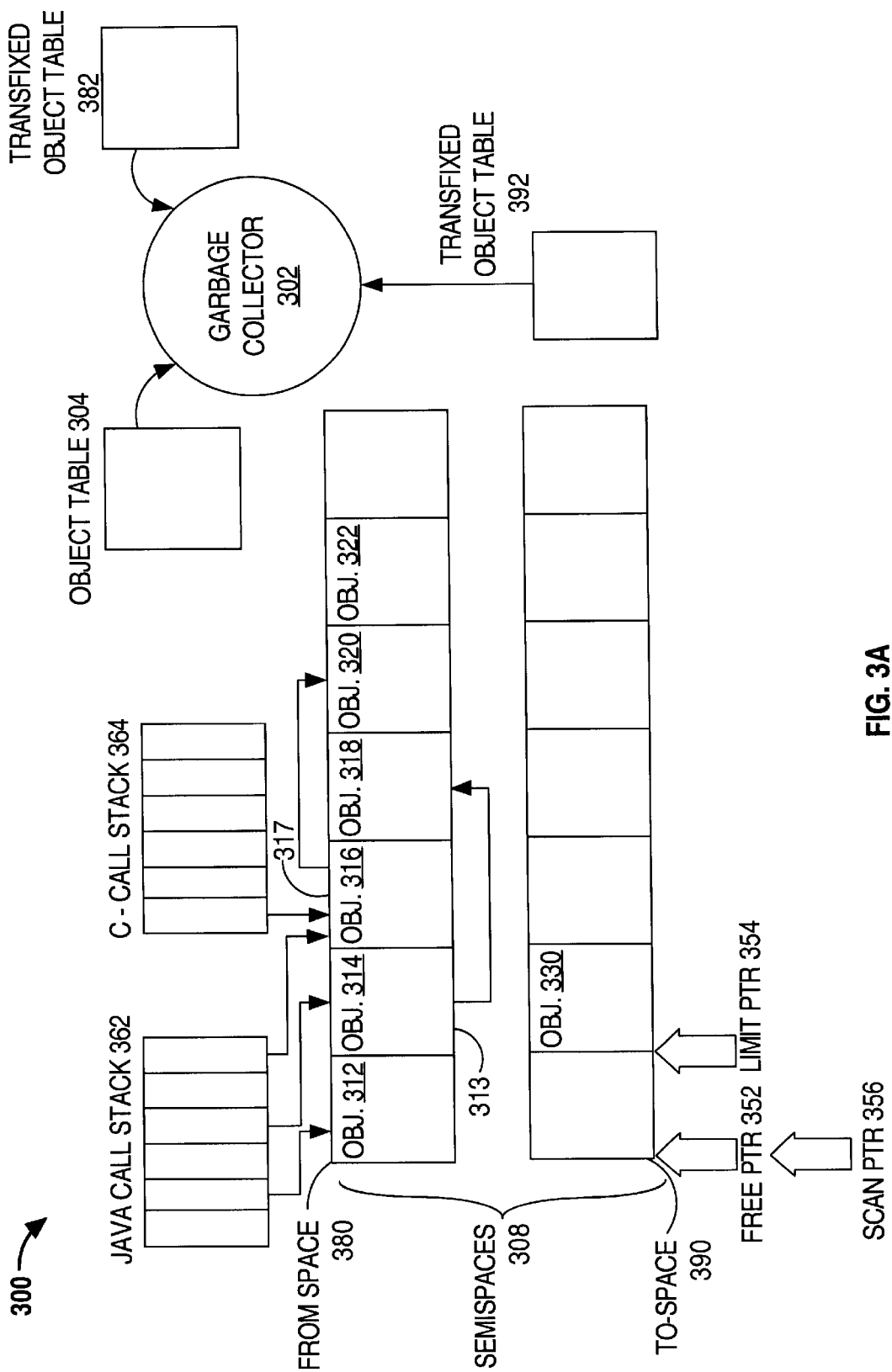
FIG. 3A is a block diagram depicting exemplary semispaces, root sets, and garbage collector according to an embodiment of the present invention.

Referring to FIG. 3A, garbage collector 302 manages semispaces 308. Semispaces 308 include from-space 380 and to-space 390. From-space 380 is currently designated as the from-space, and to-space 390 is currently designated as the to-space. From-space 380 includes objects 312, 314, 316, 318, 320, and 322. To-space 390 includes transfixed object 330.

The base root set for objects in semispaces 308 include Java™ runtime stack 362 and C call stack 364. Data structures within Java runtime stack 362 are sufficiently described such that garbage collector 302 is able to discern data structures that are references to objects in semispaces 308 from other types of data structures within Java runtime stack 362. Likewise, objects in semispaces 308 are sufficiently described such that garbage collector 302 is able to discern data structures that are references to other objects in semispaces 308 from other data structures. C-call stack 364 on the other hand, may contain references to objects in semispaces 308 which may not be discerned by garbage collector 302. Therefore, C-call stack 364 is an ambiguous root set that may contain ambiguous references to objects within semispaces 308.

Object table 304 is data that indicates the boundaries between objects in semispaces 308. In one embodiment of the present invention, object table 304 is a bit vector table that specifies the memory address of the beginning boundary of an object. For example, object table 304 may contain data indicating that memory address 313 is the beginning boundary of object 314.

A transfixed object table, such as transfixed object tables 382 and 392, is provided for each of semispaces 308, i.e. from-space 380 and to-space 390. A transfixed object table is data that indicates which objects in a particular semispace are transfixed. In an embodiment of the present invention, transfixed object table 382 is a bit vector table specifying the beginning boundaries of transfixed objects. For example, transfixed object table 392 contains data that specifies the beginning boundary of object 330, thus indicating that object 330 is transfixed. Data in transfixed object table 382 indicates that no object is transfixed in from-space 380. In another embodiment of the present inventions, transfixed object table 382 may be a table of pointers referring to each transfixed object.

Free pointer 352, limit pointer 354, and scan pointer 356 are pointers used by garbage collector 302 to manage the movement of objects between a from-space and a to-space. During garbage collection, free pointer 352 points to a memory location representing a memory address to which an object may be moved. Limit pointer 354 points to the memory address representing the beginning boundary of the transfixed object following the memory address pointed to by free pointer 352, or to the end of the to-space. Thus, the difference between free pointer 352 and limit pointer 354 represents the largest object that may be moved to the location pointed to by free pointer 352. As shall be described in further detail, scan pointer 356 is used to track, within the objects moved to the to-space, which reference is currently being used to trace live objects.

Outside of a garbage collection cycle, free pointer 352 and limit pointer 354 are used to manage the allocation of memory for new objects from the current from-space. Specifically, free pointer 352 is used to point to a memory location representing the start of a region of memory that is available for storing new objects. Limit pointer 354 points to the end of the region pointed to by free pointer 352. Thus, new objects may be stored in the region between pointers 352 and 354, but not to the area immediately beyond limit pointer 354. Limit pointer 354 points to the beginning boundary of the first transfixed object following the memory address pointed to by free pointer 352, or to the end of the from-space.

Figure 3B:
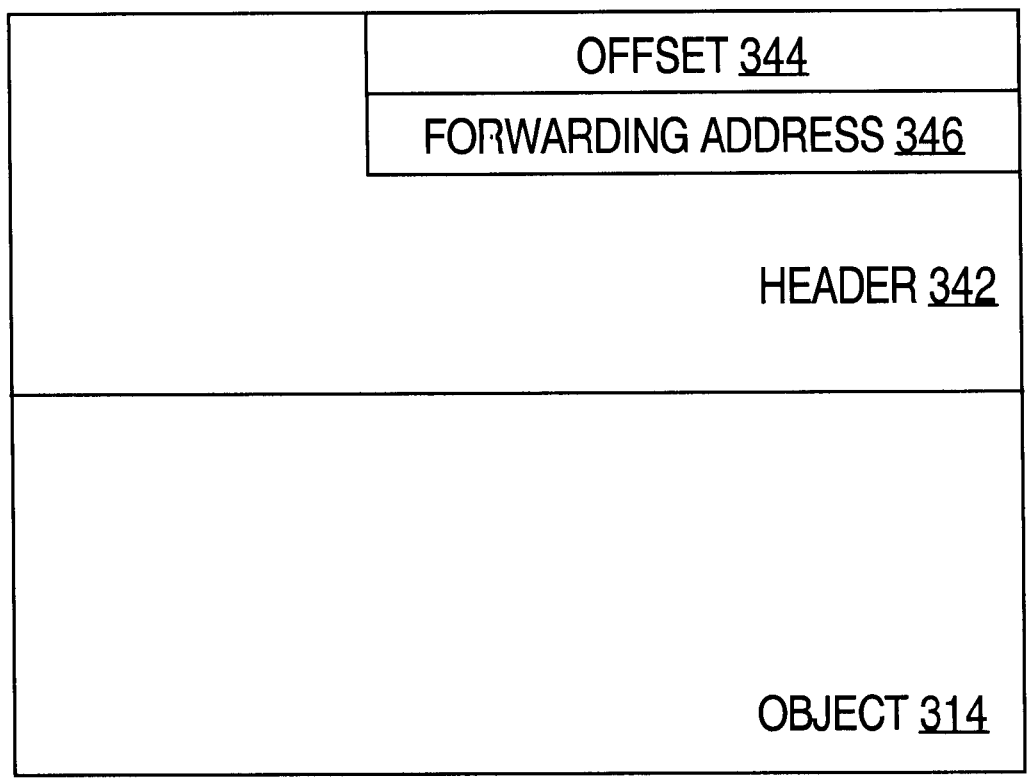
FIG. 3B is a block diagram depicting an exemplary object according to an embodiment of the present invention.

FIG. 3B shows object 314 in greater detail according to an embodiment of the present invention. Object 314, like other objects stored in semispaces 308, contains header 342. Header 342 includes data describing object 314. For purposes of exposition, header 342 is depicted as including offset field 344 and forwarding address field 346. Offset field 344 is an offset to the memory address of the ending boundary of object 314. Thus, when the beginning boundary of object 314 is known, offset 344 also indicates the size of object 314. Forwarding address field 346 is data that indicates the forwarding address of an object. The forwarding address of an object is a reference to where a copy of the object resides in the to-space. A forwarding address field will only contain data in an object that has been moved during garbage collection, and only in the copy of the object that is left in the from-space during garbage collection.

While an expositive object format as been described, those skilled in the art will recognize that the object format may vary. For example, the header may contain a flag indicating that that an object has been moved to a forwarding address, and the forwarding address may be written in the object body that follows the header. The size of an object may not be stored explicitly, but may be calculated from information in the header (e.g. object type) and other data residing in the object. Such data may be overwritten by the forwarding address. Under these conditions, the size of an object may be determined from the copy in the to-space. It is therefore understood that the present invention is not limited to any particular object format.

Figure 3C:
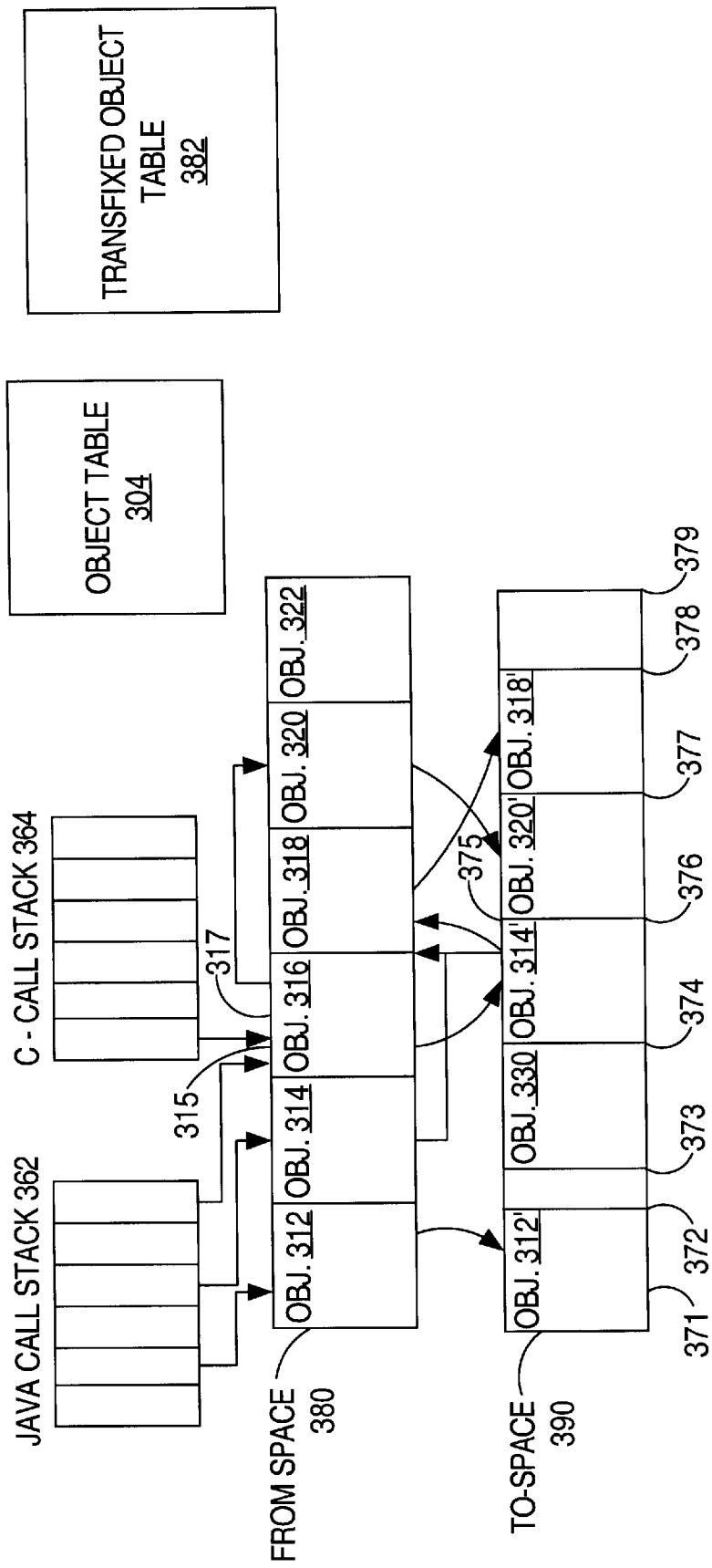
FIG. 3C is a block diagram illustrating the movement of objects between an exemplary from-space and to-space according to an embodiment of the present invention.

FIG. 3C shows the movement of objects between from-space 380 and to-space 390 according to illustrations of the techniques described herein for garbage collection. For example, object 312' represents object 312 after it is copied to-space 390.

MOVING OBJECTS TO AREAS BETWEEN BOUNDARIES OF TRANSFIXED OBJECT

At various stages of garbage collection , precisely referenced objects are moved from the from-space to the to-space between boundaries of transfixed objects that already reside in the to-space. FIG. 3 shows the steps that are performed to move an object between semispaces according to an embodiment of the invention.

To move an object from the from-space to the to-space, a copy of the object is made in the to-space at the memory address specified by free pointer 352. Before the object is copied, it is determined whether there is enough space to copy the object at the memory address specified by free pointer 352. There is enough space if the object can fit into the area of memory between the free pointer and the limit pointer. If the object is too large, then free pointer 352 is incremented to a memory address to where the object may be copied. Limit pointer 354 is then reset to either (1) the beginning boundary of the transfixed object which follows the free pointer, or if no transfixed object follows the free pointer, then to (2) the end of the to-space.

Figure 4:
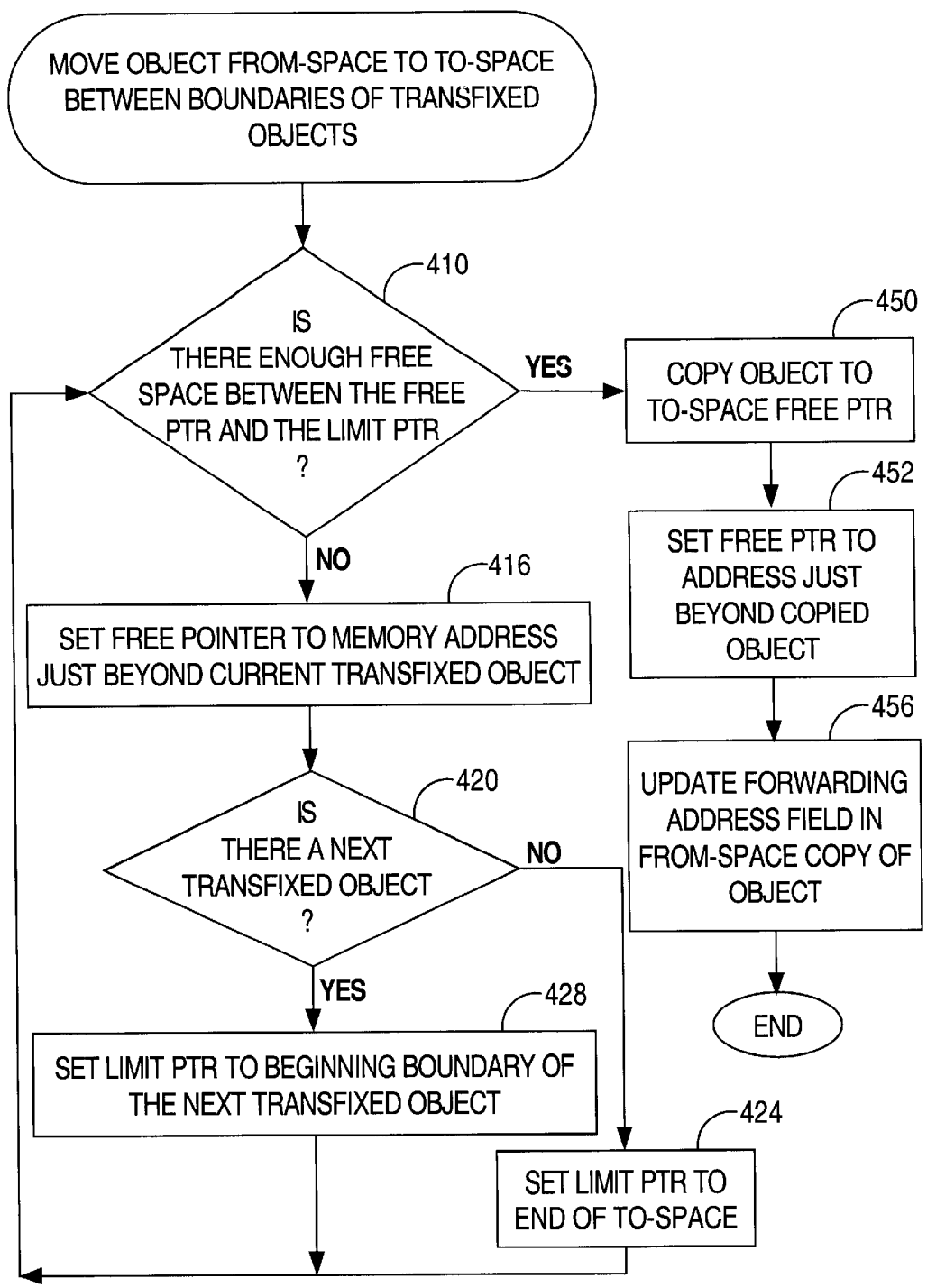
FIG. 4 is a flowchart showing steps for moving an object between a from-space and a to-space according to an embodiment of the present invention.

The steps at FIG. 4 are illustrated with reference to from-space 380 and to-space 390 as shown in FIG. 3C. For purposes of illustration, object 312 is the only object which has been moved. A copy of object 312, i.e. object 312', has been created in the to-space 390. Free pointer 352 is pointing to memory address 372, the memory address just beyond the ending boundary of object 312'. Limit pointer 354 is pointing to memory address 373, which corresponds to the beginning boundary of transfixed object 330. Garbage collector 302 has determined that object 314 is to be moved, and is beginning to execute the steps shown in FIG. 410.

At step 410, it is determined whether there is enough free space available between free pointer 352 and limit pointer 354 to copy the object at issue. If there is enough space, then control flows to step 450, where a copy of the object is created in the to-space. Otherwise, control flows to step 416. In this example, the difference between the free pointer 352 and the limit pointer 354 is compared to the size of object 314. The size of object 314 can be determined by, for example, examining offset 344. Because the size of object 314 exceeds the difference between free pointer 352 and limit pointer 354, control flows to step 416.

At step 416, the free pointer is reset to the memory address just beyond the ending boundary of the transfixed object currently pointed to by limit pointer 354. In this example, free pointer 352 is set to memory address 374, the memory address just beyond the ending boundary of transfixed object 330. Control then flows to step 420.

At step 420, it is determined whether or not there is a next transfixed object. If there is no next transfixed object, then control flows to step 424, where the limit pointer is set to the end of the to-space. Otherwise, control flows to step 428, where the limit pointer is set to the memory location of the beginning boundary of the next transfixed object.

In this example, the transfixed object table 392 is examined to determine the memory location of the beginning boundary of the transfixed object following object 330, if any. Transfixed object table 392 indicates that there is no transfixed object that follows object 330 within from-space 380. Thus, control flows to step 424, where limit pointer 354 is set to memory address 379, the end of to-space 380. Control then flows to step 410.

Continuing with the current example, at step 410, it is determined that the size of object 314 is less than the difference between free pointer 352 and limit pointer 354. Therefore, control flows to step 450.

At step 450, a copy of object 314 is created in the to-space beginning at the memory address specified by the free pointer 352. In this example, a copy of object 314 is created as object 314' at the memory address 374 currently pointed to by free pointer 352. Control then flows to step 452.

At step 452, the free pointer 352 is incremented to the memory address just beyond the boundary of the just copied object. Control then flows to step 452. In this example, free pointer 352 is incremented to memory address 376. Control flows to step 452.

At step 456, the forwarding address field of the copy in the from-space of the just moved object is updated. Execution of the steps for moving an object between boundaries then ceases. In this example, the forwarding address field in object 314 is updated to reflect memory address 374.

FINDING AMBIGUOUSLY REFERENCED OBJECTS AND THEIR BOUNDARIES

Figure 5:
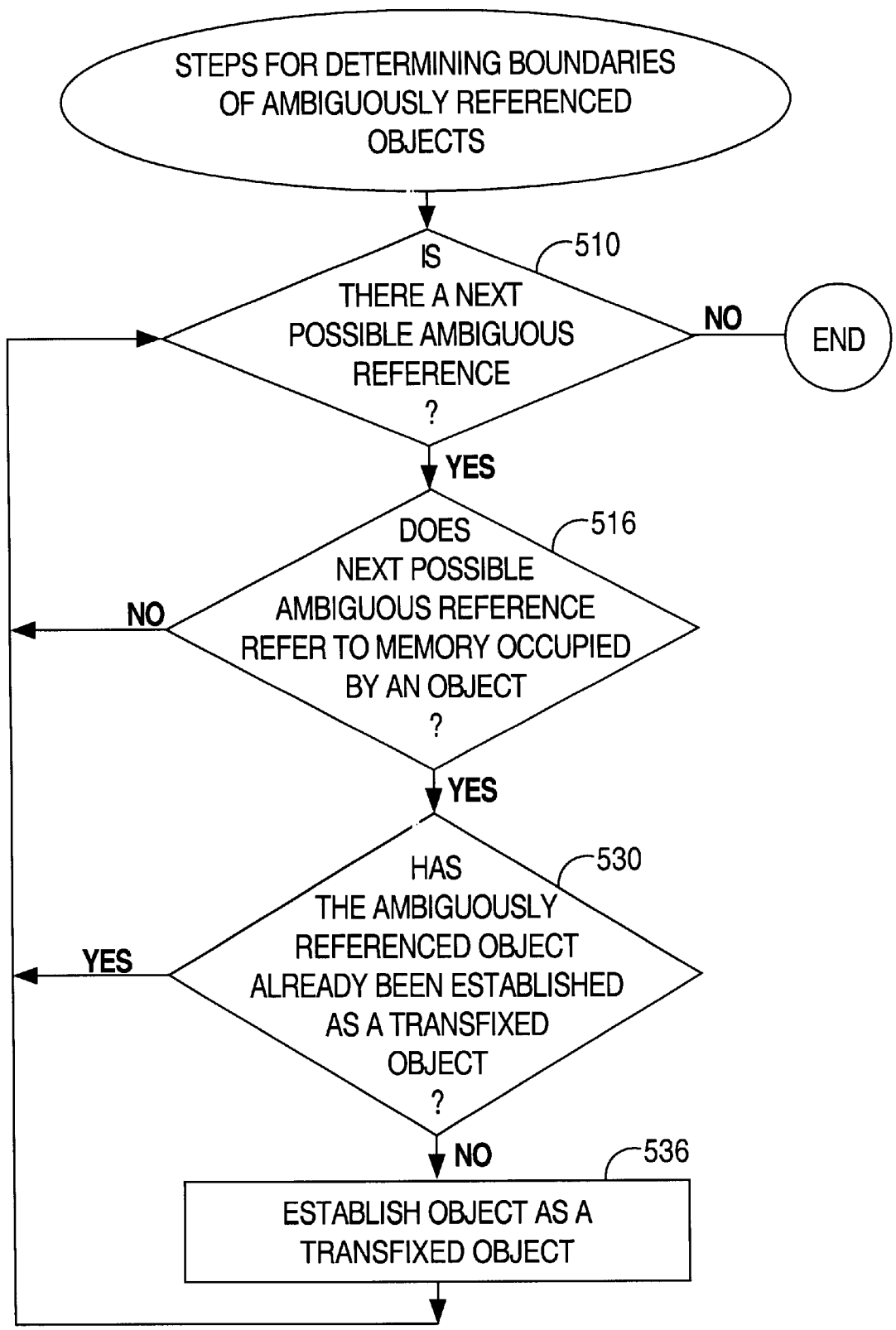
FIG. 5 is a flowchart showing steps for finding ambiguously referenced objects and their boundaries according to an embodiment of the present invention.

FIG. 5 shows the steps for finding ambiguously referenced objects and their boundaries within a from-space. As mentioned before, garbage collection of objects stored in a from-space begins by determining the boundaries of the ambiguously referenced objects in the from-space. Any ambiguously referenced objects found in the from-space are transfixed. Data specifying the memory address of the beginning boundary of the transfixed object is added to the transfixed object table of the current from-space.

The steps of FIG. 5 are performed for every ambiguous root set that may contain a reference to the set of objects being garbage collected (i.e. objects in semispaces 308). The steps of FIG. 5 are illustrated using the structures shown FIG. 3C. For purposes of illustration, no object in from-space 380 has been moved, and the steps of FIG. 5 are being performed for C-call stack 364.

At step 510, it is determined whether or not there is a next possible ambiguous reference in the ambiguous root set. A possible ambiguous reference is an area of memory which, if evaluated as a reference, refers to a range of memory corresponding to a from-space. If there is no next possible ambiguous reference, then execution of the steps end. Otherwise, control flows to step 516.

The determination of whether there is a next possible ambiguous reference is platform dependent. The term "platform dependent" refers to dependency on factors that include processor type, operating system, and compiler type associated with the C-call stack 364. For example, a C-call stack 364 may be a data structure where any reference to an object in semispaces 308 is guaranteed to be a byte aligned 32 bit word. To determine whether there is a next possible ambiguous reference, the C-call stack 364 is scanned 32 bit word by 32 bit word at a time. The scanning continues until a word is found that, when evaluated as a reference, refers to a memory address within from-space 380. In this example, C-call stack 364 is scanned until a 32 bit word is found that evaluates to a reference to memory occupied by object 316. Because a next ambiguous reference was found, control flows to 516.

At step 516, it is determined whether or not the next possible ambiguous reference refers to memory occupied by an object. If the next possible ambiguous reference refers to memory occupied by an object, then control flows to step 530.

In this example, the next possible ambiguous reference refers to memory address 317 (FIG. 3C). Object table 304 is examined to find the object boundary that lies immediately before or on memory address 317. Object table 304 specifies that the boundary at memory address 315 lies before memory address 317. This boundary is the beginning boundary of object 316. Next, the offset in the header of object 316 is examined to determine the ending boundary of object 316. Because the memory area defined by the boundaries of object 316 overlaps memory address 317, the next possible ambiguous reference refers to memory occupied by an object. Therefore, control flows to step 530.

At step 530, it is determined whether the ambiguously referenced object found at step 520 has already been established as a transfixed object. If the object has already been established as a transfixed object, control returns to step 510. Otherwise, control flows to step 536, where the object is established as a transfixed object by adding the object's beginning boundary to the transfixed object table 382.

In this example, the transfixed object table 382 is examined to determine whether or not the table already specifies that object 316 is a transfixed object. Because the transfixed object table does not specify that object 316 is a transfixed object, control flows to step 536. At step 536, the object 316 is added to the transfixed object table 382. Control then returns to step 510.

At step 510, the C-call stack 364 is scanned 32 bit word by 32 bit word. No other word evaluates to a reference to any location within from-space 380. Therefore, the steps of FIG. 5 cease.

MOVING THE PRECISELY REFERENCED OBJECTS

Figure 6:
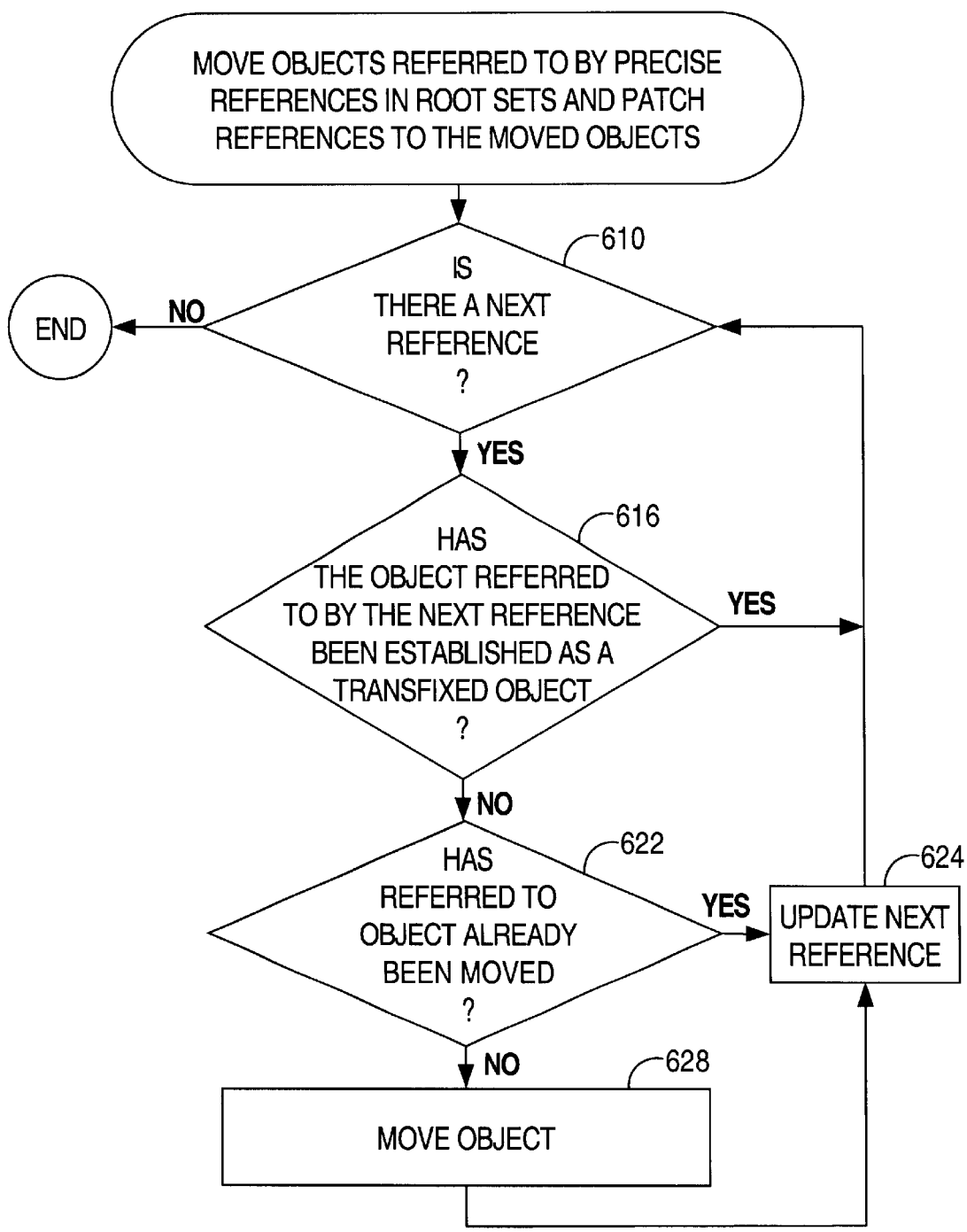
FIG. 6 is a flowchart showing steps for moving objects directly referenced by roots sets according to an embodiment of the present invention.

FIG. 6 shows the steps for moving the objects referred to by the root sets containing precise references and patching references to the moved objects. The steps shown in FIG. 6 are performed after finding the transfixed objects and their boundaries. The steps of FIG. 6 are performed for each root set that may contain precise references to objects in from-space 380. Each referenced object is moved from the from-space to the to-space, unless the object has been established as a transfixed object. The steps of FIG. 5 are illustrated using the structures shown FIG. 3C, and are being performed for Java runtime stack 362.

At step 610, it is determined whether there is a next reference in the precise root set. If there is a next reference in the precise root set, control flows to step 616. Otherwise, execution of the steps ends.

In this example, for purposes of illustration, the next reference is a reference that refers to object 312. Control thus flows to step 616.

At step 616, it is determined whether the next reference refers to an object that has already been established as a transfixed object. If the next reference refers to an object that has already been established as a transfixed object, then control returns to step 610. Otherwise, control flows to step 622.

In this example, transfixed object table 382 is examined to determine whether object 312 has already been established as a transfixed object. Object table 382 does not specify the boundary of object 312. Therefore, object 312 has not been established as a transfixed object. Control thus flows to step 622.

At step 622, it is determined whether the object has already been moved to the to-space. If the object has already been moved, control flows to step 624, where the next reference is updated to reflect the forwarding address of the object. Otherwise, control flows to step 628. In this example, there is no data in the forwarding address field of object 312. Therefore, the object has not been moved, and control flows to step 628.

At step 628, the object is moved. An object is moved by executing the steps shown in FIG. 4. In this example, for purposes of illustration, free pointer 352 points to memory address 371, the beginning of to-space 390, and limit pointer 354 points to memory address 373, the beginning boundary of transfixed object 330. Because there is enough space between pointer 352 and limit pointer 354, a copy of object 312 is created in to-space 390, beginning at the memory address pointed to by free pointer 352. Free pointer 352 is incremented to the memory address 372, the memory address just after the ending boundary of object 312'. Control then flows to step 624.

At step 624, the next reference is patched, that is, updated to reflect the beginning address of the copy just created in step 628 (i.e. memory address 371). Control then returns to step 610.

At step 610, it is determined that there is a next reference. For purposes of illustration, the next reference refers to object 314. At step 616, it is determined that object 314 is not in transfixed object table 382. Therefore, control flows to step 622. At step 622, it is determined that object 314 has not been moved because it does not have a forwarding address. Therefore, control flows to step 628. At step 628, object 314 is moved. Specifically, a copy of object 314 is created at memory address 374. At step 624, the next reference is updated to reflect memory address 374 (i.e. the forwarding address). Control flows to step 610.

At step 610, it is determined that there is a next reference. The next reference refers to object 316. Control then flows to step 616. At step 616, it is determined that object 316 has already been established as a transfixed object, because the transfixed object table 382 specifies the beginning boundary of object 316. Therefore, control returns to step 610.

At step 610, for purposes of illustration, it is determined that there is no next reference. Therefore, execution of the steps ceases. At this point, objects 312 and object 314 have been moved to the to-space 390.

MOVING OBJECTS REFERRED TO BY TRANSFIXED OBJECTS IN THE FROM-SPACE

Figure 7:
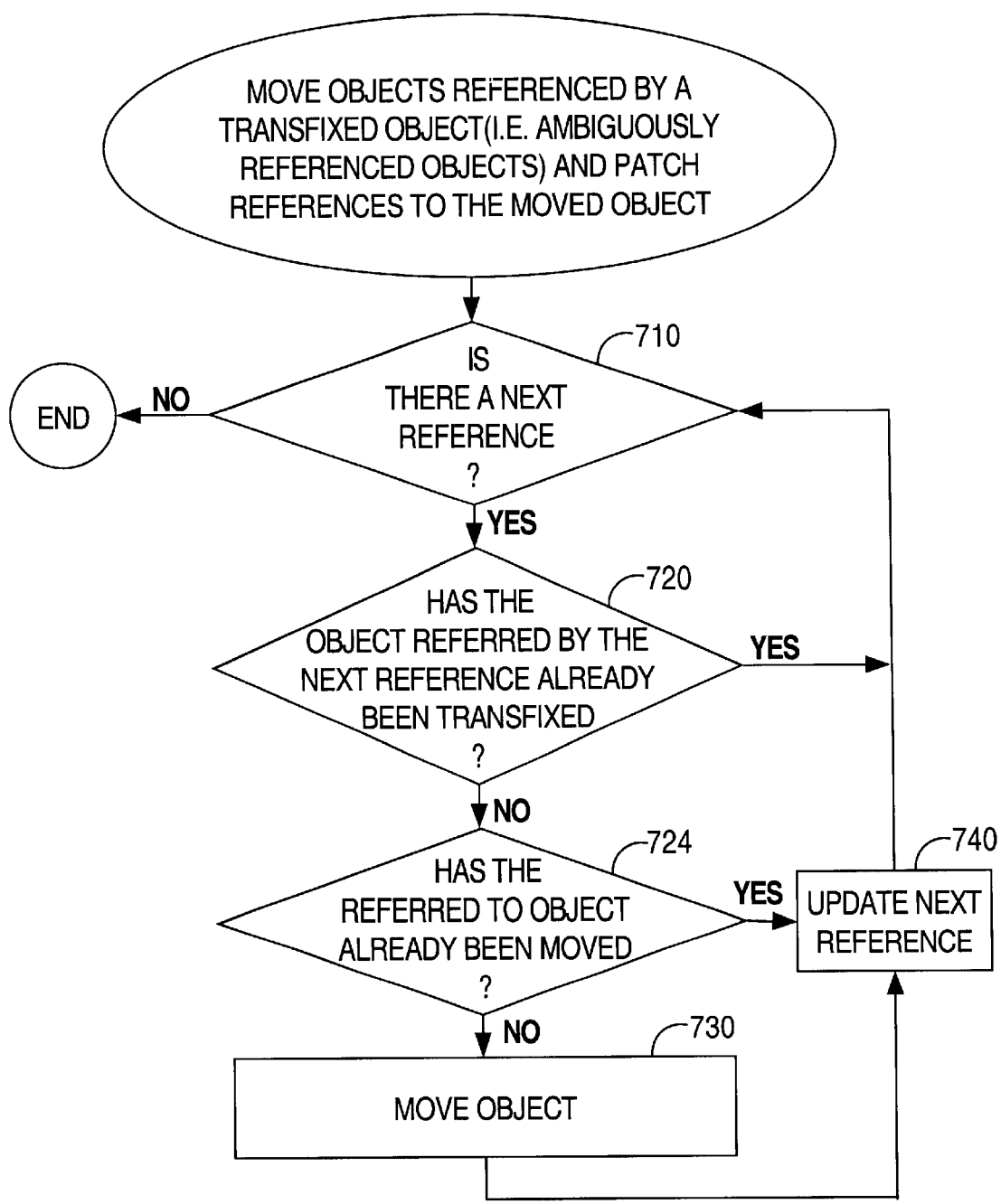
FIG. 7 is a flowchart showing steps for moving objects directly referenced by transfixed ambiguously referenced objects according to an embodiment of the present invention.

FIG. 7 shows the steps for moving objects precisely referenced by a transfixed object and for patching references to the moved objects. In the steps shown in FIG. 7, each transfixed object referred to by a transfixed object table is scanned for references to other objects. Each object referenced that is not transfixed or that has not already been moved, is moved to the to-space. If the object has already been moved, then the reference within the transfixed object is updated to reflect the location of the copy of the already moved object.

The steps of FIG. 7 are performed for each transfixed object referred to by the transfixed object table of the current from-space. The steps of FIG. 7 are illustrated using the structures shown in FIG. 3C. For purposes of illustration, object 316 is the transfixed object that is being scanned for references.

At step 710, it determined whether there is a next reference to process in the transfixed object table 382. If there is a no next reference to process, then execution ceases. Otherwise, control flows to step 720. In this example, for purposes of illustration, object 382 contains one reference, which is to object 320.

At step 720, it is determined whether the next reference refers to an object that has already been established as a transfixed object. This step is performed in a manner similar to that described for step 616. If the reference refers to an object that has already been established as a transfixed object, then control returns to step 724. Otherwise, control returns to step 710.

In this example, transfixed object table 382 is examined to determine whether object 320 has already been established as a transfixed object. Object table 382 does not specify the boundary of object 320. Therefore, object 320 has not been established as a transfixed object. Control thus flows to step 724.

At step 724, it is determined whether or not the reference refers to a moved object. If the reference refers to a moved object, the control flows to step 730, where the object is moved in accordance with the steps of FIG. 5. Otherwise, control flows to step 740, where the reference is updated to reflect memory address 376, the object's 320 forwarding address.

In this example, the forwarding address field of object 320 does not contain any data, thus control flows to step 730. At step 730, object 320 is moved in accordance with the steps shown in FIG. 5. The free pointer is moved to the memory address 377. Control then flows to step 740.

At step 740, the reference is updated to reflect the beginning boundary of object 320'. Control then flows to step 710.

At step 710, for purposes of illustration, there is no next reference in object 316. Therefore execution of the steps ceases.

MOVING THE REMAINING LIVE OBJECTS

Figure 8:
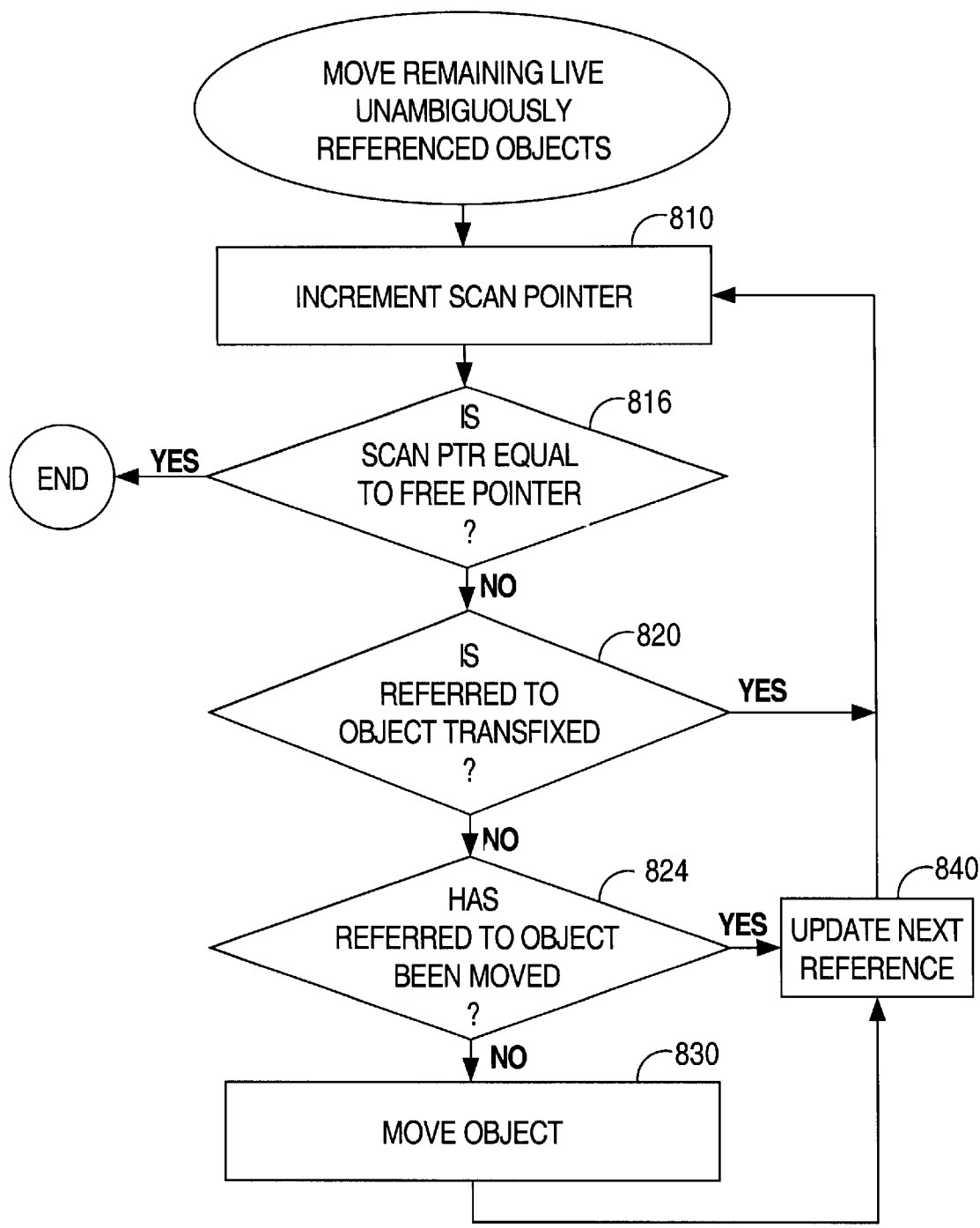
FIG. 8 is a flowchart showing steps for moving the remaining live objects which have not been established as transfixed objects according to an embodiment of the present invention.

FIG. 8 shows the steps for moving the remaining precisely referenced objects. In the steps shown in FIG. 8, each object in the to-space is scanned for references to other objects, beginning with the first object in the to-space. Each object that is referred to by a scanned reference, and that has not been transfixed or moved, is moved to the to-space. If the referred to object has been moved, then the scanned reference is updated to reflect the forwarding address.

Scan pointer 356 is maintained in manner such that it to points to the current reference being scanned. After examining the reference pointed to by scan pointer 356, scan pointer 356 is incremented to the next reference to scan. When scan pointer 356 equals free pointer 352, then every object in the to-space has been scanned, and every object that may be moved to-space 390 has been moved to to-space 390. The steps of FIG. 5 are illustrated using the structures shown in FIG. 3C. Initially, the scan pointer is set to memory address 371, the beginning boundary of the first object in the to-space 390. Free pointer 352 is set to memory address 377.

At step 810, the scan pointer is incremented to the address of the next reference, or, if there is no next reference, to a value equal to free pointer 352. In this example, for purposes of illustration, there is no reference to an object in object 312'. Furthermore, object 330 does not contain a reference to any other object. The next reference is in object 314' at memory address 375. This reference refers to object 318. Therefore, scan pointer 356 is incremented to memory address 375, where there is a reference to object 318. Control then flows to step 816.

At step 816, it is determined whether or not the scan pointer 356 is equal to the free pointer 352. If scan pointer 352 is equal to free pointer 352, then control flows to step 820. Otherwise, execution of the steps shown in FIG. 5 ceases. In this example, memory address 375 does not equal memory address 377, therefore scan pointer 356 does not equal the free pointer 352. Control thus flows to step 820.

At step 820, it is determined whether the next reference refers to an object that has already been established as a transfixed object. This step is performed in a manner similar to that described for step 616. If the next reference refers to an object that has already been established as a transfixed object, then control flows to step 824. Otherwise, control returns to step 810.

In this example, transfixed object table 382 is examined to determine whether object 318 has already been established as a transfixed object. Transfixed object table 382 does not specify the boundary of object 312. Therefore, object 312 has not been established as a transfixed object. Control thus flows to step 824.

At step 824, it is determined whether or not the next reference refers to a moved object. If the next reference refers to a moved object, then control flows to step 830, where the object is moved in accordance with the steps of FIG. 5. Otherwise, control flows to step 830, where the next reference is updated to reflect the object's forwarding address.

In this example, the forwarding address field of object 318 does not contain any data, thus control flows to step 830. At step 830, object 318 is moved in accordance with the steps shown in FIG. 5. The free pointer is moved to the memory address 378. Control then flows to step 840.

At step 840, the next reference is updated to reflect the beginning boundary of object 318'. Control then flows to step 810.

At step 810, for purposes of illustration, there is no next reference in object 318, or in any of the remaining unscanned objects in to-space 390 (i.e. object 320). Since there is no next references, scan pointer 356 is incremented to the value of the free pointer 352. At step 816, it is determined that free pointer 352 equals the scan pointer. Execution of the steps ceases.

ALLOCATING MEMORY IN THE FROM-SPACE TO NEW OBJECTS

Figure 9:
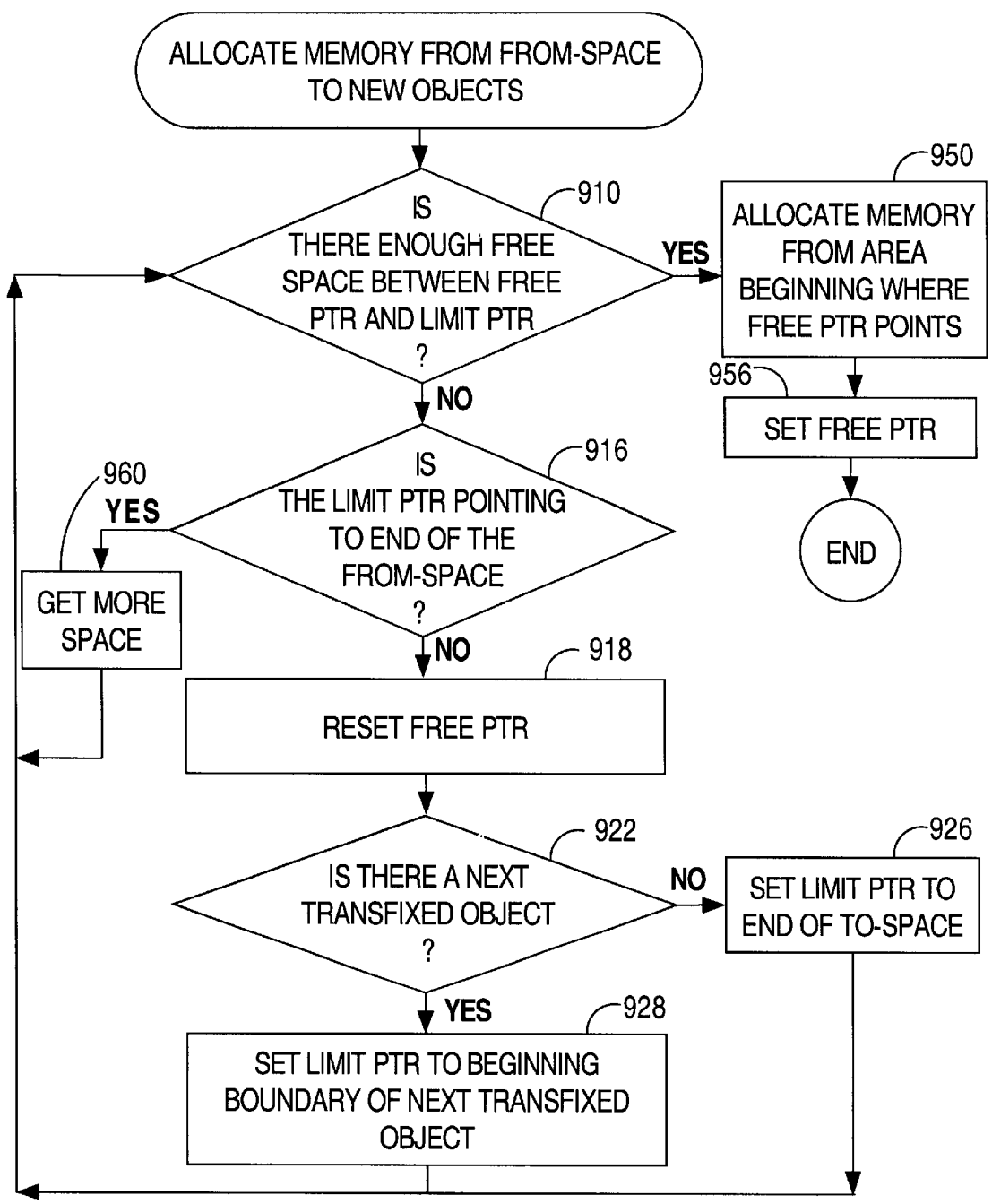
FIG. 9 is a flowchart showing steps allocating memory from a from-space for new objects.

FIG. 9 shows the steps for allocating memory for new objects. Memory for new objects is allocated at memory beginning at the address specified by free pointer 352. Before the object is copied, it is determined whether there is enough space between the memory area bounded by the free pointer and limit pointer to allocate to the object. If there is enough space, then memory is allocated to the new object.

If there is not enough space, then a determination is made of whether limit pointer 354 is set to the end of the from-space. If limit pointer 354 is set to the end of the from-space, then there is insufficient memory in the from-space. In this case, a variety measures are used to get more memory. These include invoking garbage collection and allocating more memory to the semispaces.

If, on the other hand, limit pointer 354 is not set to the end of the from-space, then free pointer 352 is set to the end of the transfixed object currently pointed by limit pointer 354. Limit pointer 354 is reset to either (1) the beginning boundary of the transfixed object which follows the free pointer, or (2) to the end of the from-space.

Referring to FIG. 9, at step 910, it is determined whether there is enough free space available between free pointer 352 and limit pointer 354 to allocate to the new object. If there is enough space, then control flows to step 950, where a copy of the object is created in the to-space. Otherwise, control flows to step 916.

At step 916, a determination is made of whether limit pointer 354 is set to the end of the from space. If limit pointer 354 is set to the end of the from-space, control flows to step 960.

At step 960, memory is obtained for the object. The are a variety of techniques that may used to obtain memory. For example, garbage collector 302 can be invoked to reclaim memory. Or, more memory may be allocated to the semipaces 308. Control then returns to step 910.

If at step 916, the determination is that the limit pointer 354 is not set to the end of from-space, control flows to step 918. At step 918, the free pointer is reset to the memory address just beyond the ending boundary of the transfixed object currently pointed to by limit pointer 354.

At step 918, it is determined whether or not there is a next transfixed object. If there is no next transfixed object, then control flows to step 926, where the limit pointer is set to the end of the from-space. Otherwise, control flows to step 928, where the limit pointer is set to the memory location of the beginning boundary of the next transfixed object. After performing step 926 or 928, control then flows to step 910.

If the determination at step 950 is that there is enough free space available between free pointer 352 and limit pointer 354 to allocate to the new object, then control flows to step 950. At step 950, memory is allocated to the new object beginning at the memory address specified by free pointer 352. Control then flows to step 952.

At step 952, the free pointer 352 is incremented to the memory address just beyond the boundary of the memory area just allocated to the new object. Execution of the steps of FIG. 9 ends.

In an embodiment of the present invention, instead of using the transfixed object table 382 to refer to each transfixed object individually, transfixed object table 382 is used as a table of pointers that refer to "sandbars". Sandbars are collections of contiguous and nearby objects that are coalesced into transfixed regions of memory. Sandbars may include regions of memory which are too small to justify making them available for allocation. When allocating memory as shown in FIG. 9, at step 922 it is determined whether there is a next sandbar, at step 918 free pointer 352 is set to the sand bar currently referenced by limit pointer 354, and at step 928 the limiting pointer 354 is set to the beginning of the next sandbar.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing memory in a computer system, the method comprising the steps of:

identifying within a first memory area a first set of objects that are ambiguously referenced;

identifying within said first memory area a second set of objects that are referenced by a set of precise references;

determining boundaries within said first memory area of each object of said first set of objects;

retaining said first set of objects within said first memory area by transfixing said first set of objects without pinning pages in which said first set of objects reside; and moving said second set of objects to a second memory area independently of whether any object of said second set of objects resides in any page occupied by an object from said first set of objects.

2. The method of claim 1, the method further including the step of:

moving a third set of objects, that are referenced by another set of precise references, to regions in said memory area that fall between and are bounded by said boundaries within said first memory area.

3. The method of claim 1, wherein the step of determining boundaries within a first memory area includes:

finding a first object referred to by a first ambiguous reference; and determining the beginning boundary of said first object.

4. The method of claim 3, wherein:

the method further includes the step of maintaining a data structure that indicates the beginning boundaries of objects stored in said first memory area; and the step of determining the beginning boundary of said first object includes accessing said data structure to determine the beginning boundary of said first object.

5. The method of claim 1, further including the steps of:

receiving a request to allocate memory to an object; and allocating for said object an unallocated portion of said first memory area in a region between said boundaries of said first set of objects.

6. The method of claim 1, wherein the method further includes the steps of:

receiving a request to allocate memory to an object;

detecting that an insufficient amount of memory is available within said second memory area for allocation to said object; and in response to detecting that an insufficient amount of memory is available, performing the steps of:

determining boundaries within said second memory area of a third set of objects that are ambiguously referenced;

retaining said third set of objects transfixed within the second memory area;

moving a fourth set of objects, that are not ambiguously referenced, from said second memory area to regions in said first memory area that fall between and are bounded by said boundaries within said first memory area; and and allocating space for said object in said first memory area.

7. A computer-readable medium carrying one or more sequences of one or more instructions for managing memory in a computer system, wherein the execution of the one or more sequences of the one or more instructions causes the one or more processors to perform the steps of:

identifying within a first memory area a first set of objects that are ambiguously referenced;

identifying within said first memory area a second set of objects that are referenced by a set of precise references;

determining boundaries within said first memory area of each object of said first set of objects;

retaining said first set of objects within said first memory area by transfixing said first set of objects without pinning pages in which said first set of objects reside; and moving said second set of objects to a second memory area independently of whether any object of said second set of objects resides in any page occupied by an object from said first set of objects.

8. The computer-readable medium of claim 7, further including the step of moving a third set of objects, that are referenced by another set of precise references, to regions in said memory area that fall between and are bounded by said boundaries within said first memory area.

9. The computer-readable medium of claim 7, wherein the step of determining boundaries within a first memory area includes:

finding a first object referred to by a first ambiguous reference; and determining the beginning boundary of said first object.

10. The computer-readable medium of claim 9, wherein:

the computer-readable medium further includes sequences of instructions for performing the step of maintaining a data structure that indicates the beginning boundaries of objects stored in said first memory area; and the step of determining the beginning boundary of said first object includes accessing said data structure to determine the beginning boundary of said first object.

11. The computer-readable medium of claim 7, further including the steps of:

receiving a request to allocate memory to an object; and allocating for said object an unallocated portion of said first memory area in a region between said boundaries of said first set of objects.

12. The computer-readable medium of claim 7, wherein the method further includes the steps of:

receiving a request to allocate memory to an object;

detecting that an insufficient amount of memory is available within said second memory area for allocation to said object; and in response to detecting that an insufficient amount of memory is available, performing the steps of:
determining boundaries within said second memory area of a third set of objects that are ambiguously referenced;
retaining said third set of objects transfixed within the second memory area;
moving a fourth set of objects, that are not ambiguously referenced, from said second memory area to regions in said first memory area that fall between and are bounded by said boundaries within said first memory area; and
and allocating space for said object in said first memory area.

13. A computer system comprising:

a processor;

a memory coupled to said processor, said processor including a first memory and a second memory area;

said processor configured to identify within said first memory area a first set of objects that are ambiguously referenced;

identifying within said first memory area a second set of objects that are referenced by a set of precise references;

said processor configured to determine boundaries within said first memory area of each object of said first set of objects;

said processor configured to retain said first set of objects within said first memory area by transfixing said first set of objects without pinning pages in which said first set of objects reside; and said processor configured to move said second set of objects to a second memory area independently of whether any object of said second set of objects resides in any page occupied by an object from said first set of objects.

14. The computer system of claim 13, further comprising:

said processor configured to determine boundaries within said second memory area of a third set of objects that are ambiguously referenced;

said processor configured to retain said third set of objects transfixed within the second memory area; and said processor configured to move a third set of objects, that are referenced by another set of precise references, to regions in said memory area that fall between and are bounded by said boundaries within said first memory area.

15. The computer system of claim 13, wherein said processor is configured to determine boundaries within said first memory area by:

finding a first object referred to by a first ambiguous reference; and determining the beginning boundary of said first object.

16. The computer system of claim 15, including:

a data structure in said memory that indicates the beginning boundaries of objects stored in said first memory area; and said processor configured to determine the beginning boundary of said first object by accessing said data structure to determine the beginning boundary of said first object.

17. The computer system of claim 13 further including:

said processor configured to receive a request to allocate memory to an object; and said processor configured to allocate for said object an unallocated portion of said first memory area in a region between said boundaries of said first set of objects.

18. The computer system of claim 13, wherein the method further includes the steps of:

receiving a request to allocate memory to an object;

detecting that an insufficient amount of memory is available within said second memory area for allocation to said object; and in response to detecting that an insufficient amount of memory is available, performing the steps of:

determining boundaries within said second memory area of a third set of objects that are ambiguously referenced;

retaining said third set of objects transfixed within the second memory area;

moving a third set of objects, that are not ambiguously referenced, to regions in said memory area that fall between and are bounded by said boundaries within said first memory area; and and allocating space for said object in said first memory area.

19. A method of performing garbage collection of a first set of objects in a memory that includes a first memory area that stores said first set of objects, the method comprising the steps of:

identifying from the first set of objects a second set of objects that are ambiguously referenced;

retaining said second set of objects within said first memory area by transfixing said first set of objects without pinning pages in which said second set of objects reside;

identifying as a third set of objects from said first set of objects all objects from the remaining objects referenced by precise references that do not belong to said second set of objects; and moving said third set of objects to a second memory area.

20. The method of claim 19, wherein the steps of identifying as a third set and moving said third set is performed independently of whether any object of said third set of objects resides in any page occupied by an object from said second set of objects.

21. The method of claim 20, wherein said any page is any logical page.

22. A computer-readable medium carrying one or more sequences of one or more instructions for performing garbage collection of a first set of objects in a memory that includes a first memory area that stores said first set of objects, wherein the execution of the one or more sequences of the one or more instructions causes the one or more processors to perform the steps of:

identifying from the first set of objects a second set of objects that are ambiguously referenced;

retaining said second set of objects within said first memory area by transfixing said first set of objects without pinning pages in which said second set of objects reside;

identifying as a third set of objects from said first set of objects all objects from the remaining objects referenced by precise references that do not belong to said second set of objects; and moving said third set of objects to a second memory area.

23. The computer-readable medium of claim 22, wherein the steps of identifying as a third set and moving said third set is performed independently of whether any object of said third set of objects resides in any page occupied by an object from said second set of objects.

24. The computer-readable medium of claim 23, wherein said any page is any logical page.

* * * * *

UNITED STATES PATENT AND TRADEMARK OFFICE
CERTIFICATE OF CORRECTION

PATENT NO.    : 6,421,689 B1  
DATED         : July 16, 2002  
INVENTOR(S)   : Benson et al.

It is certified that error appears in the above-identified patent and that said Letters Patent is hereby corrected as shown below:

<u>Title page,</u>  
Item [56], U.S. PATENT DOCUMENTS, please add the following:

| -- 5,535,390 | 7/1996  | Hildebrandt   | 711/154    |
| 5,652,883    | 7/1997  | Adcock        | 707/206    |
| 4,775,932    | 10/1988 | Oxley et al.  | 707/206    |
| 4,716,524    | 12/1987 | Oxley et al.  | 711/219    |
| 4,989,134    | 1/1991  | Shaw          | 707/206    |
| 4,853,842    | 8/1989  | Thatte et al. | 364/200    |
| 5,355,483    | 10/1994 | Serlet        | 711/154    |
| 5,321,834    | 6/1994  | Weiser et al. | 707/206 -- |

<u>Drawings,</u>  
Delete sheet 2;  
Sheet 3, replace "2B" with -- 2 --.

Signed and Sealed this

Fifth Day of November, 2002

Attest:

JAMES E. ROGAN  
*Attesting Officer*   *Director of the United States Patent and Trademark Office*